United States Patent Office 3,793,279
Patented Feb. 19, 1974

3,793,279
MONO PRIMARY POLYAMINE AND ORGANIC DIHALIDE MODIFIED, EPOXIDIZED POLYAMIDE FOR PAPER WET STRENGTH RESIN
Stanley A. Lipowski, Livingston, N.J., assignor to Diamond Shamrock Corporation, Cleveland, Ohio
No Drawing. Filed Nov. 8, 1972, Ser. No. 304,729
Int. Cl. D21h 3/58; C08g 20/38
U.S. Cl. 260—29.2 EP                                      24 Claims

ABSTRACT OF THE DISCLOSURE

Cationic extended terminated polyamide resins are prepared which exhibit highly desirable paper wet strength properties.

BACKGROUND OF THE INVENTION

(1) Field of the invention

This invention relates to cationic extended terminated polyamide resins, their preparation, and their use for increasing the wet strength of paper. Relevant United States classes appear to be 162/164, 260/29.2 and 260/78.

(2) Description of the prior art

The closest known prior art are U.S. Pat. Nos. 2,926,116; 2,926,154; 3,125,552; 3,535,288; and 3,645,954; and French Pat. No. 884,271 (which corresponds to Belgian Pat. No. 446,643).

U.S. Pat. No. 2,926,116 discloses a paper wet strength resin that is uncured, thermosetting, and cationic, and which comprises a water-soluble polymeric reaction product of epichlorohydrin and a polyamide derived from a polyalkylene polyamine and a saturated aliphatic dibasic carboxylic acid containing from 3 to 10 carbon atoms.

U.S. Pat. No, 2,926,154 is a continuation-in-part of No. 2,926,116 and differs essentially in that the polyalkylene polyamines contain two primary amine groups and at least one secondary amine group, and the preferred saturated aliphatic dibasic carboxylic acids are those having from 3 to 8 carbon atoms, plus diglycolic acid.

U.S. Pat. No. 3,125,552, discloses a paper wet strength resin which comprises a water-soluble polymeric reaction product of epichlorohydrin and a polyamide derived from a polyalkylene polyamine having at least two primary amine groups and at least one secondary amine group, and an unsaturated polycarboxylic acid having at least one carbon to carbon double bond.

U.S. Pat. No. 3,535,288 discloses a paper wet strength resin which comprises a polyamide, which is the reaction product of an amino carboxylate and a polyalkylene polyamine, and which is then reacted with epichlorohydrin.

U.S. Pat. No. 3,645,954 discloses a paper wet strength resin which is made by reacting an aliphatic dicarboxylic acid with a polyalkylene amine, reacting the resulting polyamide with a lactam, and then reacting the resulting block copolyamide with epichlorohydrin.

French Pat. No. 884,271 discloses a resin for improving paper, inter alia, which comprises the reaction product of epichlorohydrin with an amine, which is then further reacted with a compound containing a reactive hydrogen atom, such as certain carboxylic acids, alcohols, or amines; as well as the epoxidation of a polyamide produced from a polyamine and an acid ester.

SUMMARY OF THE INVENTION

This invention comprises cationic polyamides which have highly desirable wet strength properties and which exhibit excellent stability at higher concentrations. The general procedure for synthesis of these resins is as follows:

(1) An acid is reacted with a backbone polyamine to form a "base polyamide" with terminal carboxylic groups;
(2) The base polyamide is reacted with a terminating polyamine to form a "terminated base" (polyamide) with terminal secondary and/or tertiary amino groups;
(3) The terminated base is reacted with a chain extender to form an "extended base"; and then
(4) The extended base is reacted with an epoxidizing agent to form an "epoxidized base," which is the completed wet strength resin.

The resin is added to paper pulp or preformed paper to increase the wet strength of the finished paper. Wet-strength paper is produced by incorporating in paper during its manufacture from about 0.1 to about 5.0% by dry weight of the resins of the present invention based on the dry weight of the pulp present in the paper and thereafter curing the resins in the paper to a water-insoluble state, thereby producing a wet-strength paper. The preferred point of addition is after the pulp has reached a refined stage. The resin in the paper can be cured by heating the paper containing the resin at from about 80 to about 120° C. for from about 0.5 to about 30 minutes. Paper produced with the resins of this invention has improved wet-strength. Desirable properties exhibited by using the resins of this invention and/or paper treated therewith include rapid curing, easy repulpability, non-foaming tendencies, low sizing, good rewetting, rapid pulp drainage and excellent machine performance. Additionally, the resins are very stable and exhibit long shelf-life.

DESCRIPTION OF THE PREFERRED EMBODIMENTS

(1) Reactant components

The acids useful in this invention can be individual acids or mixtures of acids and include:

(a) saturated dicarboxylic acids having 4 to 12 carbon atoms;
(b) non-decarboxylating unsaturated dicarboxylic acids having from 5 to 12 carbon atoms;
(c) saturated and non-decarboxylating unsaturated tricarboxylic acids having 6 to 10 carbon atoms;
(d) $C_{1-12}$ alkyl mono- and di-esters of saturated and unsaturated dicarboxylic acids having 2 to 12 carbon atoms;
(e) $C_{1-12}$ alkyl mono- and di-esters of saturated and unsaturated tricarboxylic acids having 6 to 10 carbon atoms; and
(f) anhydrides of saturated and unsaturated dicarboxylic acids having 4 or 5 carbon atoms.

Useful and preferred acids utilized in the examples of this invention, infra, are:

(1) Acids containing 2 carbon atoms: diethyloxalate
(2) Acids containing 3 carbon atoms: diethylmalonate
(3) Acids containing 4 carbon atoms: succinic acid, succinic anhydride, diethylsuccinate, monomethyl succinate, maleic anhydride, D,L-malic acid
(4) Acids containing 5 carbon atoms: glutaric acid, glutaric anhydride, dimethylglutarate, itaconic acid
(5) Acids containing 6 carbons: adipic acid, monomethyl adipate
(6) Acids containing 7 carbon atoms: pimelic acid
(7) Acids containing 8 carbon atoms: suberic acid
(8) Acids containing 9 carbon atoms: azelaic acid
(9) Acids containing 10 carbon atoms: sebacic acid A useful and preferred acid not utilized in the examples of this invention is diglycollic acid.

A useful acid which is not preferred, and which was utilized in Example 43 of this invention, is citric acid.

Other acids which may be utilized in this invention include, but are not limited to, methylmaleic acid, dibutyl α-ketoglutarate, diethyl β-ketoglutarate, tricarballylic acid, 3,4-hexadiendioic acid, hexyl pimelate, didecyl suberate, methyl octyl azelate, didodecyl sebacate, undecandioic acid, dodecandioic acid, 4-octenedioic acid, and the like.

The preferred acids may be used either alone or in combination with other acids. Acids which are not preferred may be used alone only if the resulting resin has a wet strength of at least 14%. Where the resulting resin using a particular acid has a wet strength of from 10% up to but not including 14%, that acid may be used only in combination with a preferred acid, so that the resin resulting from the combination of acids has a wet strength of at least 14%. An acid whose resulting resin has a wet strength of under 10% is not considered to be within the scope of this invention. [See "Testing of Wet Strength Efficacy, infra.]

The backbone polyamines useful in this invention can be any one or a mixture of polyamines, branched or straight chain, provided that they contain at least 2 primary amines which may be located anywhere on the chain and at least one secondary or tertiary amine which also may be located anywhere on the chain. Examples of preferred backbone polyamines include, but are not limited to: prim, sec-diethylenetriamine; prim, sec-tetraethylenepentamine; prim, tert-bis(aminopropyl) methylamine; prim, sec-pentaethylenehexamine; and prim, sec-triethylenetetramine. Other useful backbone amines include: prim, sec-imino-bis-propylamine; prim, sec-dibutylenetriamine; prim, sec-tetrapropylenepentamine; prim, sec-imino-bis-hexylamine; and prim, tert-bis(aminoethyl) propylamine.

The terminating polyamines useful in this invention can be any one or a mixture of polyamines, branched or straight chain, provided that they contain only one primary amine which may be located anywhere on the chain and at least one secondary or tertiary amine which also may be located anywhere on the chain.

Examples of preferred terminating amines include, but are not limited to: prim, tert-dimethylaminopropylamine; and prim, sec-N-aminoethylethanolamine. Other useful terminating amines include: prim, tert-diethylaminoethylamine; prim, tert-methylbutylaminopropylamine; and prim, sec-aminoethylisopropanolamine.

The chain extenders useful in this invention can be any one or a mixture of alkyl dihalide, alkyl ether dihalide, phenyl bis(alkyl halide), and phenyl alkyl dihalide containing from 1 to 12 carbon atoms.

Examples of preferred useful chain extenders include, but are not limited to, methylenedibromide, ethylenedibromide, methylenediiodide, dichloroethylether, dichloroisopropylether, and triglycol dichloride. Other useful chain extenders include phenyl bis(methyl chloride), phenyl butyl dibromide, and the like.

As used in this invention, the term "epoxidizing agent" means an epoxy compound used to cap amine groups on the extended base. The epoxidizing agents useful in this invention can be any one or a mixture of epihalohydrin and alkyl substituted epihalohydrin. Examples of useful epoxidizing agents are epichlorohydrin, epibromohydrin, epiiodohydrin, epifluorohydrin, bromoepoxybutane, chloroepoxyhexane, iodoepoxyisobutane, and the like. Preferred epoxidizing agents are epichlorohydrin and epibromohydrin.

(2) Reactant parameters

The proportions of the chemicals used in the synthesis of the wet strength resin are as follows.

In the formation of the base polyamide, the mole ratio of the backbone amine to the acid must always be less than 1 to 1. The maximum range of molar ratio is about 0.66 to about 0.99:1 and the preferred range is about 0.75 to about 0.95:1. It is critical that fewer moles of the backbone polyamine be present than of the acid, so that the base polyamide has free carboxylic groups remaining, thus permitting reaction with the terminating amine.

The base polyamide is reacted with at least sufficient terminating polyamine to cap all free carboxylic groups remaining. It is preferred to use a slight excess of terminating polyamine to ensure complete capping of the base polyamide.

The terminated base is reacted with the chain extendr in approximately equimolar quantities.

Th extended base is reacted with from about 0.6 mole to about 1.5 moles of epoxidizing agent (and preferably about 1.0 to about 1.4 moles) per unreacted secondary or tertiary amine remaining on the extended base, with the proviso that the amount of epoxidizing agent is not sufficiently in excess to reduce the pH of the reaction medium below about 5, as a result of hydrolysis.

There is no limitation to the length or molecular weight of the completed polymer, except that the wet strength resin must be soluble in water or capable of forming a colloidal dispersion. The presence of large numbers of epoxidized amino groups will permit very large polymers (for example, a polymer having a molecular weight of 40,000 where the amino groups on the backbone are separated by not more than 6 consecutive carbon atoms).

One of the great advantages of this invention is that a high concentration (percentage) of active material can be produced. This is done by reducing the amount of water added when extending the terminated base or when epoxidizing the extended base. If a reduced amount of water is added, the reaction temperature must also be reduced and the reaction time may be lengthened. Because the polymers of this invention are still reactive and are thermosetting, it is not possible to increase the percentage of active material by conventional drying methods. Therefore, the water added during the synthesis and pH adjustment remains with the resin and comprises at least 30 parts by weight per 70 parts by weight of resin, in the final product. A high percentage of active material is very desirable as it reduces transportation costs and increases ease of handling.

Normal temperature parameters are: from about 120 to about 240° C. for formation of the base polyamide; from about 120 to about 180° C. for formation of the terminated base; from about 100 to about 120° C. for formation of the extended base; and from about 40 to about 90° C. for formation of the epoxidized base.

Exceptions to the normal temperature parameters are required when using acids containing five carbon atoms, diesters, esters of decarboxylating acids, and hydroxy acids. Where exceptions to temperature parameters are not given below, further reactions in the sequence are run at the normal temperature parameters. Where the acid used requires conflicting exceptions, the lower temperature range should be used.

Acids containing five carbon atoms are reacted at from about 120 to about 175° C. for formation of the base polyamide and from about 120 to about 170° C. for formation of the terminated base. Further reactions in the sequence are run at normal temperature parameters. The reduction of the upper temperature parameters is dictated by the tendency of acids containing five carbon atoms to form insoluble cyclic polymers.

Diesters are reacted at normal minimum temperatures of about 80° C. and at maximum temperatures of either the reflux temperature of the alcohol/resin mixture, or the temperature at which the resin polymer degrades, whichever is lower, for formation of the base polyamide. These temperatures also apply to formation of the terminated base and the extended base. The alcohol referred to above is the by-product of the formation of the base polyamide (see "Preparation of the Resin," infra) and its nature will depend on the diester used. For example, using a dimethyl ester will produce methyl alcohol, using an ethylhexyl ester will produce ethyl alcohol and hexyl alcohol, and using a didodecyl ester will produce dodecyl alcohol. Of course, if the alcohol is removed from the base polyamide, the temperature limitations will not apply to the further reactions in the sequence.

Esters of decarboxylating acids are reacted at lower temperatures as they are less stable than the esters of non-decarboxylating acids. Oxalic acid esters are reacted at from about 15 to about 25° C. for formation of the base polyamide, at from about 70 to about 90° C. for formation of the terminated base, at from about 70 to about 90° C. for formation of the extended base, and at from about 40 to about 70° C. for formation of the epoxidized base. Malonic acid esters are reacted at from about 80 to about 160° C. for formation of the base polyamide, at from about 80 to about 100° C. for formation of the terminated base, and at from about 80 to about 100° C. for formation of the extended base.

Hydroxy acids usually are reacted at lower temperatures as they usually are less stable than the corresponding non-hydroxy acids. D,L-malic acid (hydroxy succinic acid) is reacted at from about 120 to about 155° C. for formation of the base polyamide and at from about 100 to about 120° C. for formation of the terminated base.

Reaction time parameters are: about 1 to 6 hours for formation of the base polyamide; about 15 minutes to 3 hours for formation of the terminated base; about 1 to 3 hours for formation of the extended base; and about 20 minutes to 15 hours for epoxidation to form the wet strength resin. A notable exception to the above parameters are oxalic acid esters which require about 5 hours to about 20 hours for formation of the base polyamide. The reaction time in a given instance will depend upon the temperature at which the reaction is conducted. A higher temperature will require a shorter reaction time. It should further be noted that these time parameters only apply once the desired reaction temperature has been reached.

If the resins of this invention are prepared with reactant or process parameters outside the above, an insoluble gel may result.

(3) Preparation of the resin

The wet strength resins of this invention can be prepared by utilizing the parameters given in the examples with the following procedure, unless otherwise noted.

(1) Preparation of the base polyamide:
  (a) If an acid or anhydride is used, it is first charged into a reaction vessel and then mixed with at least sufficient water to produce a uniform slurry. The backbone polyamine is then added and the mixture is agitated until uniform. An exothermic reaction results. Heat is then applied, accompanied by stirring, until a uniform solution results. The heating is continued until it reaches the highest desired temperature while most of the water is removed by distillation. This includes both added water and water formed by the reaction. The heating is further continued at the same temperature and a vacuum is applied until all remaining water is removed.
  (b) If an ester which is liquid is used, no water is added. The ester is charged into a reaction vessel and the backbone polyamine is then added, accompanied by agitation until a uniform solution is produced. Either an exothermic or an endothermic reaction will result, depending upon the ester chosen. Generally, an unsaturated acid ester will produce an exothermic reaction and a saturated acid ester will produce an endothermic reaction. An exception is oxalic acid esters, which produce exothermic reactions. The reaction vessel is then heated to the desired temperature and maintained at that temperature for the desired time, under continual agitation. An alcohol will be produced as a reaction by-product if the ester is a diester. If the ester is a mono-ester, both alcohol and water will be produced. The alcohol from a diester may be allowed to remain or can be removed by distillation. The alcohol/water mixture from a monoester must be removed, as water cannot be allowed to remain.
  (c) If an ester which is solid is used, the ester is first charged into a reaction vessel and then heated until it is melted. The melted ester is then treated as if it were a liquid ester and the above procedure is followed.
  (d) An exception to the above are esters of oxalic acid. These esters are charged into a reaction vessel to which is first added a water-miscible alcohol with agitation, in order to form an alcohol solution. The base polyamine is then added to the alcohol solution accompanied by agitation. As an exothermic reaction results, the vessel is cooled in order not to exceed the desired temperature (see Example 1, Table Ia, infra).

(2) Preparation of the terminated base: To the vessel containing the base polyamide prepared above, is added a terminating amine. Agitation is maintained throughout this reaction. The vessel is then heated to the desired temperature. While the vessel is maintained at the desired temperature, a vacuum is applied until any excess of unreacted terminating polyamine is removed.

(3) Preparation of the extended base: To the vessel containing the terminated base is charged water at least sufficient to make a uniform solution. The amount of water will depend upon the desired percentage of active material in the final product. Thus, a lower amount of water will result in a more active final product. Agitation is maintained throughout this reaction. The chain extender is added and the mixture is then heated to the desired temperature.

(4) Preparation of the epoxidized base: To the vessel containing the extended base is charged additional water in an amount depending on the desired concentration of the final product. Agitation is maintained throughout this reaction. An epoxidizing agent is then added in the desired amount and dissolved. The solution is then heated to the desired temperature and maintained at that temperature until the reaction is complete. Completeness of the reaction may be determined by an increase in viscosity measured by any conventional viscometer. A recording viscometer is preferred, in order to permit continual monitoring of the reaction. The preferred viscosity is just below the gelation point.

(5) Preparation of the final product: To the vessel containing the epoxidized base is added water in an amount sufficient to reduce the concentration of active material to the desired level and an acid such as hydrochloric, sulfuric, nitric, phosphoric, formic, or acetic, in an amount sufficient to reduce the pH to from about 1.0 to about 5.5. All of this is accompanied by continual agitation.

Where the phrases "desired amount," "desired temperature," "desired time," etc. are used, they are intended to refer to the values given in the "Reaction Parameters," supra, or to the values for any given example, infra.

(4) Use of the resin for increasing wet strength

The resins of this invention are used in paper-making to increase the wet-strength of paper. These resins can be applied to paper or other felted cellulosic products by beater, tub, spray application or the like. A preferred method of incorporating these resins in paper is internal addition of the resin to the pulp prior to sheet formation to take advantage of the substantivity of the resins for hydrated cellulosic fibers. In practicing this method of application, an aqueous solution of the resin in its uncured and hydrophilic state is added to an aqueous suspension of paper stock in the beater, stock chest, Jordan, fan pump, head box, or other suitable point, before sheet formation. About 0.1 to about 5.0 parts by weight of dry resin (and preferably about 0.5 part to about 1.5 parts by weight) based on 100 parts by weight of dry pulp are added to the aqueous suspension of paper stock. The quantity of resin added to the aqueous stock suspension will depend on the degree of wet-strength desired in the finished paper and on the amount of resin retained by the paper fibers. Paper sheet is then formed from the paper stock containing the resins and heated at about 80 to about 120° C. for from about 0.5 to about 30 minutes to cure the resin in the paper to a polymerized water-insoluble state which imparts wet-strength to the paper sheet.

These resins can also be applied to preformed partially or completely dried paper by spraying, impregnating, immersing, coating, or other suitable methods for application of aqueous solutions of these resins in paper making. Application and curing is then effected in the same amounts and manner as if the resin were incorporated in the pulp.

The resins of this invention can be cured under acid, neutral or alkaline conditions, e.g., at a pH of from about 4.0 to about 10.0, and preferably about 7.0 to about 9.0, (see Table III, infra). Optimum results can be achieved with these resins under the neutral or alkaline application and curing conditions which frequently exist in paper making. Since extensive corrosion of equipment occurs under acid conditions, it is an advantage that acid conditions are not required. Paper produced with these resins has greatly improved wet-strength. As defined herein, "paper" includes paper towels, absorbent tissues, filter papers, paper for resin saturation, and the like, as well as heavier stocks such as wrapping paper, bag paper, paperboard, corrugated containers, and the like.

(5) Testing of wet strength efficacy

The standard used herein and in the paper industry for a wet strength resin is that based upon a paper written by K. W. Britt which appeared in the April 1944 issue of "The Paper Industry and Paper World" at page 37. According to that article, a wet strength paper may be defined as being a paper in which the wet tensile strength is at least 15% of the dry tensile strength. In view of the fact that the reactant components used to make the wet strength resins of this invention may be mixtures, and allowing for experimental error, it is considered that a resin achieving 14% or higher wet strength is adequate. It is possible to use mixtures of resins having from 10% up to 14% wet strength with resins having over 14% wet strength, provided that the mixture has a wet strength of at least 14%. It is also possible to use resins synthesized from mixtures of preferred and nonpreferred acids provided that the resulting resin has a wet strength of at least 14% (see "Reactant Components," supra). Such mixtures may be desirable due to considerations such as the cost of teh base chemicals or the ease of production.

The resin was tested as follows. Handsheets of paper were prepared in a conventional manner according to TAPPI procedures using 100 ml. of 2% consistency unbleached kraft pulp (2 g. dry weight) with 1, 2, 4 or 6 ml. additions of a 1% by weight solution of the resins of Examples 1 through 68, that is, 0.5, 1.0, 2.0 or 3.0 percent respectively by weight of dry resin based on the weight of dry pulp.

Samples of the above handsheets were then cured, and tested according to TAPPI test procedures T 456 m–49 and T 404 ts–66. The wet strengths obtained using these tests are shown in the column headed "percent wet strength" in Tables I and II.

(6) Examples and test results

Tables I, Ia, and Ib: The following tables contain summaries of the preparation and wet strength test results of forty-nine resins. All of these were prepared according to the procedure stated in "Preparation of the Resin," supra, but all of them are not within the scope of the invention. All resins having a "percent wet strength" of at least 10% at either a 0.5%, 1.0%, 2.0% or a 3.0% concentration are considered to be within the scope of this invention. Resins having a wet strength of at least 14% at either a 0.5%, 1.0%, 2.0% or a 3.0% concentration are preferred. Table Ia has the temperature parameters for the examples of Table I, both that of the actual synthesis and of the acceptable range. Table Ib has actual gram quantities of reactants and reactant times for all of the examples of Table I. The key to the footnotes in Tables I and Ib will be found after Table IIb.

TABLE I

| Example number | I. Acid | II. Backbone polyamine (prim, sec, tert) | Mole ratio, II/I | III. Terminating polyamine (prim, sec, tert) | IV. Chain extender | V. Epoxidizing agent | Mole ratio, V/active NH | Percent active | Percent wet strength 0.5% added | 1.0% added |
|---|---|---|---|---|---|---|---|---|---|---|
| 1 | Diethyl oxalate. | Triethylenetetramine (1, 2). | 0.9 | Dimethylaminopropylamine (1,3). | Dichlorethyl ether. | Epichlorohydrin. | 1.26 | 39.5 | 16.0 | 21.1 |
| 2 | Oxalic acid [11] | Diethylenetriamine (1, 2). | 0.95 | ---do--- | ---do--- | ---do--- | 1.16 | 30.0 | 2.1 | 2.3 |
| 3 | Malonic acid. [11] | ---do--- | 0.95 | ---do--- | Triglycol dichloride. | ---do--- | 1.14 | 25.0 | 1.9 | 1.9 |
| 4 | ---do--- | Tetraethylenepentamine(1,2). | 0.95 | ---do--- | ---do--- | ---do--- | 0.84 | 21.5 | 3.3 | 4.4 |
| 5 | Diethyl malonate. | Diethylenetriamine (1, 2). | 0.94 | ---do--- | Dichlorethyl ether. | ---do--- | 1.15 | 25.0 | 18.1 | 22.3 |
| 6 | β-Propiolactone.[2] | Diethylenetriamine | 0.92 | ---do--- | ---do--- | ---do--- | 1.14 | 22.2 | 2.8 | 4.3 |
| 7 | Succinic acid | Diethylenetriamine (1, 2). | 0.95 | ---do--- | ---do--- | ---do--- | 1.14 | 28.0 | 15.1 | 17.0 |
| 8 | Succinic anhydride. | ---do--- | 0.94 | ---do--- | ---do--- | ---do--- | 1.14 | 22.0 | 13.2 | 16.5 |
| 9 | Maleic anhydride.[3] | Tetraethylenepentamine (1, 2). | 0.94 | ---do--- | ---do--- | ---do--- | 1.14 | 26.0 | 10.2 | 14.0 |
| 10 | Diethyl succinate. | Bis(aminopropyl) methylamine (1, 3). | 0.75 | ---do--- | ---do--- | ---do--- | 1.15 | 14.0 | 15.5 | 17.5 |
| 11 | Mono-methyl succinate. | Diethylenetriamine (1, 2). | 0.95 | ---do--- | ---do--- | ---do--- | 1.14 | 21.7 | 15.0 | 16.0 |
| 12 | DL-malic acid. [4] | ---do--- | 0.95 | ---do--- | ---do--- | ---do--- | 1.14 | 25.0 | 13.2 | 15.5 |
| 13 | Succinyl chloride. | ---do--- | 0.93 | ---do--- | ---do--- | ---do--- | 1.14 | 32.8 | 1.8 | 1.9 |
| 14 | Fumaric acid. [3][11] | ---do--- | 0.95 | ---do--- | Methylene dibromide. | ---do--- | 1.09 | 16.0 | 1.0 | 1.0 |
| 15 | Glutaric acid | ---do--- | 0.95 | ---do--- | Dichlorethyl ether. | ---do--- | 1.05 | 25.0 | 18.6 | 21.6 |
| 16 | Glutaric anhydride. | ---do--- | 0.95 | ---do--- | ---do--- | ---do--- | 1.05 | 25.0 | 18.0 | 21.8 |
| 17 | Dimethyl glutarate. | ---do--- | 0.95 | ---do--- | ---do--- | ---do--- | 1.31 | 60.0 | 21.2 | 22.6 |
| 18 | Itaconic acid.[3] | ---do--- | 0.95 | ---do--- | Triglycol dichloride. | ---do--- | 1.14 | 18.8 | 18.4 | 22.8 |
| 19 | γ-Valerolactone,[2] | ---do--- | 0.95 | ---do--- | Dichlorethyl ether. | ---do--- | 1.14 | 33.3 | 1.7 | 1.8 |

TABLE I—Continued

| Example number | I. Acid | II. Backbone polyamine (prim, sec, tert) | Mole ratio, II/I | III. Terminating polyamine (prim, sec, tert) | IV. Chain extender | V. Epoxidizing agent | Mole ratio, V/active NH | Percent active | Percent wet strength 0.5% added | Percent wet strength 1.0% added |
|---|---|---|---|---|---|---|---|---|---|---|
| 20 | do | do | 0.95 | Dimethylaminopropylamine. | do | do | 2.28 | 40.2 | 2.6 | 3.1 |
| 21 | Adipic acid | do | 0.95 | Dimethylaminopropylamine (1,3). | do | do | 1.14 | 10.0 | 21.2 | 24.1 |
| 22 | do | do | 0.95 | do | do | do | 1.34 | 41.7 | 18.7 | 22.9 |
| 23 | do | do | 0.95 | do | do | do | 1.15 | 30.0 | 19.3 | 23.1 |
| 24 | do | Pentaethylenehexamine (1,2). | 0.95 | Aminoethyl ethanolamine (1,2). | do | do | 0.91 | 29.8 | 15.2 | 17.5 |
| 25 | do | do | 0.95 | Dimethylaminopropylamine (1,3). | Triglycol dichloride. | do | 1.14 | 34.5 | 19.9 | 24.4 |
| 26 | do | do | 0.95 | do | Ethylene dibromide. | do | 1.14 | 34.7 | 20.2 | 23.8 |
| 27 | do | do | 0.95 | do | Diiodomethane. | do | 1.14 | 34.5 | 19.6 | 24.6 |
| 28 | do | Triethylenetetramine (1,2). | 0.95 | do | Dichlorethyl ether. | do | 1.02 | 28.0 | 15.4 | 18.1 |
| 29 | do | Pentaethylenehexamine (1,2). | 0.95 | do | do | do | 1.02 | 24.0 | 15.2 | 16.6 |
| 30 | do | Bis(aminopropyl)-methylamine (1,3). | 0.95 | do | Triglycol dichloride. | do | 1.27 | 15.8 | 16.4 | 20.0 |
| 31 | do | do | 0.95 | Aminoethylethanolamine(1,2). | Dichlorethyl ether. | do | 1.27 | 16.5 | 14.1 | 16.5 |
| 32 | do | Diethylenetriamine (1,2). | 0.95 | do | do | do | 1.05 | 19.1 | 16.9 | 19.5 |
| 33 | do | Triethylenetetramine (1,2). | 0.95 | do | do | do | 1.05 | 24.0 | 13.9 | 16.7 |
| 34 | do | Pentaethylenehexamine (1,2). | 0.95 | do | do | do | 1.05 | 33.3 | 14.8 | 17.4 |
| 35 | do | Diethylenetriamine (1,2). | 0.85 | Dimethylaminopropylamine (1,3). | Triglycol dichloride. | do | 1.27 | 18.0 | 21.0 | 24.7 |
| 36 | do | do | 0.9 | do | do | do | 1.20 | 18.0 | 21.4 | 23.6 |
| 37 | do | do | 0.95 | do | Dichlorethyl ether. | do | 0.84 | 23.4 | 18.0 | 21.5 |
| 38 | do | do | 0.95 | do | do | do | 1.05 | 15.1 | 21.0 | 23.5 |
| 39 | do | do | 0.95 | do | do | do | 1.57 | 16.4 | 20.1 | 23.4 |
| 40 | do | do | 0.95 | do | do | do | 1.89 | 34.7 | 15.0 | 18.1 |
| 41 | do | do | 0.95 | do | do | do | 1.34 | 41.7 | 6 22.3 | 6 27.2 |
| 42 | Monomethyl adipate. | do | 0.95 | do | do | do | 1.14 | 18.5 | 19.2 | 22.8 |
| 43 | Citric acid 7 | do | 0.90 | do | Triglycol dichloride. | do | 1.14 | 22.0 | 7.0 | 10.4 |
| 44 | Adipic acid | do | 0.95 | do | Dichlorethyl ether. | do | 1.14 | 10.0 | 8 25.8 | 9 30.2 |
| 45 | Pimelic acid | do | 0.95 | do | do | do | 1.05 | 14.5 | 16.1 | 19.9 |
| 46 | Suberic acid | do | 0.95 | do | do | do | 1.14 | 11.0 | 18.0 | 21.8 |
| 47 | Azelaic acid | Tetraethylenepentamine (1,2). | 0.95 | do | do | do | 0.70 | 20.0 | 14.1 | 17.6 |
| 48 | do | Diethylenetriamine (1,2). | 0.95 | do | do | do | 1.0 | 24.0 | 19.9 | 24.0 |
| 49 | Sebacic acid | do | 0.9 | do | do | do | 1.14 | 20.0 | 14.5 | 15.4 |

See footnotes at end of table IIb.

TABLE Ia

| Example number | Base polyamide Actual temp. | Base polyamide Temp. range | Terminated base Actual temp. | Terminated base Temp. range | Extended base Actual temp. | Extended base Temp. range | Resin (epoxidation) Actual temp. | Resin (epoxidation) Temp. range |
|---|---|---|---|---|---|---|---|---|
| 1 | 22 | 15–25 | 80 | 70–90 | 80 | 70–90 | 75 | 40–70 |
| 2 | 160 | 120–160 | 150 | 120–160 | 100 | 100–120 | 75–85 | 40–90 |
| 3 | 200 | 120–200 | 165 | 120–180 | 100 | 100–120 | 70–75 | 40–90 |
| 4 | 200 | 120–240 | 165 | 120–180 | 100 | 100–120 | 70–90 | 40–90 |
| 5 | 84–144 | 80–160 | 85 | 80–100 | 85 | 80–100 | 65 | 40–90 |
| 6 | 120 | 100–150 | 120 | 100–150 | 110 | 100–120 | 75–85 | 40–90 |
| 7 | 200 | 120–240 | 165 | 120–180 | 105 | 110–120 | 70–76 | 40–90 |
| 8 | 202 | 120–240 | 180 | 120–180 | 107 | 100–120 | 70–86 | 40–90 |
| 9 | 200 | 120–240 | 180 | 120–180 | 105 | 100–120 | 65–80 | 40–90 |
| 10 | 200 | 80–200 | 100 | 80–160 | 108 | 80–110 | 75–80 | 40–90 |
| 11 | 200 | 120–240 | 160 | 120–180 | 105 | 100–120 | 75 | 40–90 |
| 12 | 150 | 120–155 | 120 | 100–120 | 102 | 100–120 | 65 | 40–90 |
| 13 | 10–15 | 0–25 | 25 | 20–30 | 100 | 100–120 | 70 | 40–90 |
| 14 | 160 | 120–170 | 130 | 120–160 | 100 | 100–120 | 80 | 40–90 |
| 15 | 174 | 120–175 | 170 | 120–170 | 101 | 100–120 | 57 | 40–90 |
| 16 | 162 | 120–165 | 170 | 120–170 | 102 | 100–120 | 54 | 40–90 |
| 17 | 80–150 | 80–170 | 90 | 80–100 | 80 | 80–100 | 50 | 40–90 |
| 18 | 200 | 120–240 | 170 | 120–180 | 103 | 100–120 | 75 | 40–90 |
| 19 | 240 | 120–240 | 150 | 120–180 | 110 | 100–120 | 75 | 40–90 |
| 20 | 240 | 120–240 | 150 | 120–180 | 110 | 100–120 | 75 | 40–90 |
| 21 | 200 | 120–240 | 165 | 120–180 | 105 | 100–120 | 75 | 40–90 |
| 22 | 200 | 120–240 | 165 | 120–180 | 105 | 100–120 | 75 | 40–90 |
| 23 | 210 | 120–240 | 180 | 120–180 | 106 | 100–120 | 60–65 | 40–90 |
| 24 | 200 | 120–240 | 165 | 120–180 | 114 | 100–120 | 60–68 | 40–90 |
| 25 | 210 | 120–240 | 168 | 120–180 | 100 | 100–120 | 60–63 | 40–90 |
| 26 | 210 | 120–240 | 168 | 120–180 | 101 | 100–120 | 60–64 | 40–90 |
| 27 | 210 | 120–240 | 168 | 120–180 | 100 | 100–120 | 60 | 40–90 |
| 28 | 210 | 120–240 | 165 | 120–180 | 107 | 100–120 | 63–70 | 40–90 |
| 29 | 200 | 120–240 | 165 | 120–180 | 118 | 100–120 | 62–72 | 40–90 |
| 30 | 200 | 120–240 | 175 | 120–180 | 105 | 100–120 | 70 | 40–90 |
| 31 | 200 | 120–240 | 170 | 120–180 | 105 | 100–120 | 75 | 40–90 |
| 32 | 200 | 120–240 | 165 | 120–180 | 109 | 100–120 | 62–75 | 40–90 |
| 33 | 200 | 120–240 | 165 | 120–180 | 110 | 100–120 | 60–75 | 40–90 |
| 34 | 200 | 120–240 | 165 | 120–180 | 114 | 100–120 | 70–72 | 40–90 |
| 35 | 200 | 120–240 | 154 | 120–180 | 107 | 100–120 | 70–75 | 40–90 |
| 36 | 200 | 120–240 | 160 | 120–180 | 105 | 100–120 | 70–73 | 40–90 |
| 37 | 210 | 120–240 | 180 | 120–180 | 106 | 100–120 | 60–68 | 40–90 |
| 38 | 200 | 120–240 | 165 | 120–180 | 106 | 100–120 | 70–72 | 40–90 |
| 39 | 200 | 120–240 | 165 | 120–180 | 106 | 100–120 | 70–85 | 40–90 |
| 40 | 210 | 120–240 | 180 | 120–180 | 106 | 100–120 | 70–75 | 40–90 |
| 41 | 200 | 120–240 | 165 | 120–180 | 105 | 100–120 | 50 | 40–90 |

TABLE Ia—Continued

| Example number | Base polyamide Actual temp. | Base polyamide Temp. range | Terminated base Actual temp. | Terminated base Temp. range | Extended base Actual temp. | Extended base Temp. range | Resin (epoxidation) Actual temp. | Resin (epoxidation) Temp. range |
|---|---|---|---|---|---|---|---|---|
| 42 | 201 | 120–240 | 175 | 120–180 | 106 | 100–120 | 60–75 | 40–90 |
| 43 | 200 | 120–240 | 150 | 120–180 | 105 | 100–120 | 73 | 40–90 |
| 44 | 200 | 120–240 | 165 | 120–180 | 105 | 100–120 | 70 | 40–90 |
| 45 | 200 | 120–240 | 177 | 120–180 | 104 | 100–120 | 70–80 | 40–90 |
| 46 | 200 | 120–240 | 170 | 120–180 | 103 | 100–120 | 57 | 40–90 |
| 47 | 202 | 120–240 | 175 | 120–180 | 103 | 100–120 | 45 | 40–90 |
| 48 | 200 | 120–240 | 167 | 120–180 | 100 | 100–120 | 51 | 40–90 |
| 49 | 180 | 120–240 | 155 | 120–180 | 105 | 100–120 | 65 | 40–90 |

TABLE Ib
[Weight in grams; time in hours]

| Ex. No. | Base polyamide I. Acid | Base polyamide II. Backbone polyamine | Base polyamide Water | Base polyamide Reaction time | Terminated base III. Terminating polyamine | Terminated base Reaction time | Extended base IV. Chain extender | Extended base Water | Extended base Reaction time | Epoxidized V. Epoxidizing agent | Epoxidized Water | Epoxidized Reaction time |
|---|---|---|---|---|---|---|---|---|---|---|---|---|
| 1 | 25 | 22.5 | 12 30 | 20 hr | 4.1 | 1 hr. 30 min | 2.5 | 40 | 2 hr | 36 | 0 | 3 hr. |
| 2 | 42 | 32.5 | 84 | 2 hr | 3.3 | 1 hr | 2.3 | 20 | 1 hr | 34 | 128 | 4 hr. 15 min. |
| 3 | 104 | 97.8 | 104 | 2 hr. 8 min | 10.2 | 1 hr | 10.0 | 100 | 1 hr. 30 min | 100 | 800 | 13 hr. |
| 4 | 52 | 80.0 | 52 | 2 hr. 55 min | 5.1 | 1 hr | 5.0 | 75 | 1 hr. 30 min | 110 | 500 | 13 hr. |
| 5 | 160 | 97.0 | 0 | 4 hr. 45 min | 11.0 | 1 hr | 8.0 | 100 | 1 hr. 16 min | 100 | 600 | 4 hr. 50 min. |
| 6 | 72 | 95.0 | 0 | 2 hr | 18.0 | 1 hr | 12.0 | 100 | 1 hr. 30 min | 100 | 900 | 14 hr. 30 min. |
| 7 | 118 | 97.8 | 118 | 2 hr. 15 min | 10.2 | 1 hr | 8.0 | 100 | 1 hr. 30 min | 100 | 700 | 7 hr. 25 min. |
| 8 | 51 | 48.5 | 51 | 1 hr | 6.0 | 1 hr. 25 min | 4.0 | 50 | 1 hr. 30 min | 500 | 50 | 7 hr. 37 min. |
| 9 | 49 | 89.0 | 100 | 1 hr. 40 min | 10.0 | 1 hr. 40 min | 5.0 | 70 | 1 hr. 35 min | 70 | 700 | 6 hr. 35 min. |
| 10 | 87 | 54.4 | 0 | 3 hr | 25.5 | 1 hr | 18.0 | 50 | 2 hr | 50 | 455 | 8 hr. 30 min. |
| 11 | 66 | 49.0 | 66 | 1 hr. 30 min | 5.1 | 1 hr | 4.0 | 50 | 1 hr | 50 | 500 | 9 hr. 20 min. |
| 12 | 134 | 97.8 | 134 | 3 hr | 10.2 | 1 hr | 8.0 | 100 | 1 hr. 30 min | 100 | 600 | 7 hr. 40 min. |
| 13 | 77.5 | 48.0 | 13 200 | 1 hr. 45 min | 5.0 | 30 hr | 4.0 | 100 | 1 hr | 50 | 200 | 13 hr. 30 min. |
| 14 | 58 | 49.0 | 100 | 2 hr | 5.1 | 15 hr | 6.0 | 100 | 2 hr | 48 | 270 | 3 hr. 30 min. |
| 15 | 66 | 49.0 | 66 | 2 hr. 30 min | 5.1 | 55 hr | 4.0 | 150 | 1 hr. 20 min | 46.2 | 276 | 1 hr. 16 min. |
| 16 | 57 | 49.0 | 57 | 2 hr. 15 min | 5.1 | 1 hr. 14 min | 4.0 | 50 | 1 hr. 35 min | 46.2 | 350 | 1 hr. 26 min. |
| 17 | 384 | 234.8 | 0 | 1 hr. 8 min | 24.5 | 55 min | 18.0 | 300 | 1 hr. 22 min | 277.0 | 0 | 2 hr. 23 min. |
| 18 | 65 | 48.9 | 65 | 1 hr. 30 min | 5.1 | 1 hr. 10 min | 5.0 | 100 | 1 hr. 30 min | 50.0 | 550 | 5 hr. |
| 19 | 50 | 49.0 | 0 | 3 hr | 5.1 | 1 hr | 4.0 | 50 | 1 hr. 30 min | 50.0 | 250 | 7 hr. 30 min. |
| 20 | 50 | 49.0 | 0 | 3 hr | 5.1 | 1 hr | 4.0 | 50 | 1 hr. 30 min | 100.0 | 250 | 7 hr. 30 min. |
| 21 | 292 | 195.7 | 292 | 3 hr. 10 min | 25.0 | 2 hr | 16.0 | 200 | 1 hr. 30 min | 200.0 | 2,400 | 3 hr. 45 min. |
| 22 | 292 | 195.7 | 292 | 4 hr. 30 min | 25.0 | 2 hr | 16.0 | 200 | 1 hr. 30 min | 237.0 | 195 | 5 hr. 50 min. |
| 23 | 146 | 97.8 | 146 | 2 hr | 12.5 | 2 hr | 8.0 | 100 | 1 hr. 30 min | 150.0 | 400 | 1 hr. 35 min. |
| 24 | 146 | 220.0 | 146 | 2 hr | 10.4 | 1 hr | 8.0 | 100 | 1 hr. 30 min | 120.0 | 1,200 | 1 hr. 30 min. |
| 25 | 146 | 97.8 | 146 | 2 hr. 45 min | 12.5 | 2 hr | 10.5 | 480 | 2 hr. 30 min | 99.0 | 0 | 1 hr. 50 min. |
| 26 | 146 | 97.8 | 146 | 2 hr. 45 min | 12.5 | 2 hr | 10.5 | 480 | 2 hr. 30 min | 99.0 | 0 | 2 hr. 10 min. |
| 27 | 146 | 97.8 | 146 | 2 hr. 45 min | 12.5 | 2 hr | 13.5 | 480 | 2 hr. 30 min | 99.0 | 0 | 1 hr. 45 min. |
| 28 | 146 | 138.7 | 146 | 1 hr. 30 min | 10.2 | 1 hr. 15 min | 8.0 | 125 | 1 hr. 30 min | 180.0 | 930 | 6 hr. 40 min. |
| 29 | 146 | 220.0 | 146 | 1 hr. 30 min | 10.2 | 1 hr. 10 min | 8.0 | 75 | 1 hr. 30 min | 360.0 | 1,940 | 7 hr. 50 min. |
| 30 | 146 | 136.0 | 146 | 1 hr. 30 min | 10.2 | 1 hr. 10 min | 10.0 | 100 | 1 hr. 30 min | 112.0 | 1,000 | 1 hr. 15 min. |
| 31 | 146 | 136.0 | 146 | 1 hr. 30 min | 10.4 | 1 hr. 10 min | 8 | 100 | 1 hr. 30 min | 112.0 | 1,000 | 6 hr. |
| 32 | 146 | 97.8 | 146 | 1 hr. 30 min | 10.4 | 1 hr. 20 min | 8 | 100 | 1 hr. 30 min | 92.0 | 800 | 13 hr. 30 min. |
| 33 | 146 | 138.7 | 146 | 1 hr. 30 min | 10.4 | 1 hr. 15 min | 8 | 100 | 1 hr. 30 min | 184.0 | 1,280 | 13 hr. 45 min. |
| 34 | 146 | 220.0 | 146 | 1 hr. 30 min | 10.4 | 1 hr. 15 min | 8 | 100 | 1 hr. 30 min | 368.0 | 1,200 | 7 hr. 30 min. |
| 35 | 146 | 87.5 | 146 | 1 hr | 30.6 | 1 hr. 15 min | 10 | 100 | 1 hr. 30 min | 100.0 | 800 | 55 min. |
| 36 | 146 | 92.7 | 146 | 1 hr | 20.4 | 1 hr. 10 min | 10 | 100 | 1 hr. 30 min | 100.0 | 800 | 1 hr. 50 min. |
| 37 | 146 | 97.8 | 146 | 2 hr | 12.5 | 2 hr | 8 | 100 | 1 hr. 30 min | 74.0 | 400 | 2 hr. 10 min. |
| 38 | 146 | 97.8 | 146 | 3 hr. 10 min | 12.5 | 2 hr | 8 | 100 | 1 hr. 30 min | 92.4 | 1,150 | 1 hr. 15 min. |
| 39 | 146 | 97.8 | 146 | 3 hr. 10 min | 12.5 | 2 hr | 8 | 100 | 1 hr. 30 min | 138.0 | 1,150 | 14 hr. |
| 40 | 146 | 97.8 | 146 | 2 hr | 12.5 | 2 hr | 8 | 100 | 1 hr. 30 min | 166.8 | 400 | 15 hr. |
| 41 | 292 | 195.7 | 292 | 4 hr. 30 min | 25.0 | 2 hr | 16 | 200 | 1 hr. 30 min | 237.0 | 195 | 5 hr. 50 min. |
| 42 | 32 | 19.6 | 0 | 1 hr. 15 min | 2.5 | 2 hr. 45 min | 1.5 | 20 | 1 hr. 30 min | 20.0 | 125 | 6 hr. 10 min. |
| 43 | 105 | 70.0 | 96 | 1 hr | 10.2 | 1 hr | 5 | 100 | 1 hr. 30 min | 100.0 | 900 | 5 hr. 30 min. |
| 44 | 292 | 195.7 | 292 | 3 hr. 10 min | 25.0 | 2 hr | 16 | 200 | 1 hr. 30 min | 200.0 | 2,400 | 3 hr. 45 min. |
| 45 | 40 | 24.4 | 40 | 1 hr. 45 min | 3.0 | 1 hr. 35 min | 2.5 | 30 | 1 hr. 37 min | 23.2 | 445 | 7 hr. 10 min. |
| 46 | 87 | 48.9 | 87 | 2 hr. 10 min | 5.1 | 1 hr. 25 min | 4 | 50 | 1 hr. 36 min | 50.0 | 260 | 2 hr. 15 min. |
| 47 | 94 | 90.0 | 94 | 2 hr. 45 min | 5.1 | 15 min | 4 | 100 | 1 hr | 92.5 | 800 | 21 min. |
| 48 | 94 | 48.9 | 94 | 1 hr. 20 min | 5.1 | 1 hr. 15 min | 4 | 50 | 1 hr. 30 min | 46.2 | 366 | 2 hr. 15 min. |
| 49 | 101 | 46.6 | 96 | 2 hr. 50 min | 10.2 | 1 hr. 15 min | 8 | 50 | 1 hr. 30 min | 50.0 | 300 | 4 hr. 35 min. |

See footnotes at end of table IIb.

Tables II, IIa, and IIb: The following tables contain summaries of the preparation and wet strength test results of nineteen resins which are not within the scope of this invention. The resins were prepared according to U.S. Pats. 2,926,116 and 2,926,154, unless otherwise indicated. Table II indicates the reactants, their mole ratios, and the activity and percent wet strength of the resins. Table IIa gives the actual temperatures used in the synthesis as well as the range disclosed by the art upon which the example was based. Table IIb gives the reactant quantities and the times of the reactant steps. A key to the footnotes in Tables II and IIb will be found at the end of Table IIb.

TABLE II

| Example No. | I. Acid | II. Backbone polyamine (prim, sec, tert) | Mole ratio, II/I | III. Terminating polyamine (prim, sec, tert) | IV. Chain extender | V. Epoxidizing agent | Mole ratio, V/active NH | Percent active | Percent wet strength 0.5% added | Percent wet strength 1.0% added |
|---|---|---|---|---|---|---|---|---|---|---|
| 50 | Sebacic acid | Diethylenetriamine (1,2) | 0.95 | Dimethylaminopropylamine(1,3) | Dichlorethyl ether | | | | Water insoluble | |
| 51 | Diethyl oxalate [1] | do | 1.0 | | | Epichlorohydrin | 1.2 | 42.2 | 6.1 | 9.0 |
| 52 | do [1] | Triethylenetetramine (1,2) | 1.0 | | | do | 1.2 | 8.5 | 11.1 | 13.7 |
| 53 | Oxalic acid [1] | Diethylenetriamine (1,2) | 1.09 | | | do | 1.08 | 20.3 | 1.3 | 1.7 |
| 54 | Malonic acid | do | 1.09 | | | do | 1.08 | 19.8 | 1.4 | 1.5 |
| 55 | Succinic acid | do | 1.06 | | | do | 1.0 | 21.5 | 13.9 | 20.0 |

TABLE II—Continued

| Example No. | I. Acid | II. Backbone polyamide (prim, sec, tert) | Mole ratio, II/I | III. Terminating polyamine (prim, sec, tert) | IV. Chain extender | V. Epoxidizing agent | Mole ratio, V/active NH | Percent active | Percent wet strength 0.5% added | Percent wet strength 1.0% added |
|---|---|---|---|---|---|---|---|---|---|---|
| 56 | Glutaric acid | do | 1.08 | | | do | 1.08 | 17.4 | 16.0 | 20.0 |
| 57 | Dimethyl glutarate [1] | do | 1.1 | | | do | 1.0 | 15.0 | 15.5 | 16.5 |
| 58 | Itaconic acid [3 5] | do | 1.1 | | | do | 1.0 | 10.0 | 17.0 | 21.0 |
| 59 | Adipic acid | do | 1.1 | | | do | 1.0 | 10.0 | 18.5 | 22.0 |
| 60 | do | do | 1.1 | | | do | 1.0 | 10.0 | [8] 24.8 | [9] 28.3 |
| 61 | do | do | 0.95 | Dimethylaminopropylamine(1,3) | Dichlorethyl ether | Ethylene dibromide [10] | 1.39 | 14.0 | 5.5 | 7.4 |
| 62 | Pimelic acid | do | 1.10 | | | Epichlorohydrin | 1.0 | 11.0 | gel | |
| 63 | Suberic acid | do | 1.10 | | | do | 1.0 | | Gel | |
| 64 | do | Diethylenetriamine plus Ethylenediamine Ratio 2/3 | 1.4 | | | do | 0.5 | 8.0 | 3.7 | 5.1 |
| 65 | do | Ethylenediamine plus diethylenetriamine ratio 1:10 | 1.1 | | | do | 1.0 | | Gel | |
| 66 | do | do | 1.1 | | | do | 0.5 | | Gel | |
| 67 | do | Ethylenediamine plus diethylenetriamine ratio 4:6 | 1.1 | | | do | 0.5 | | Gel | |
| 68 | do | do | 1.1 | | | do | 1.0 | | Gel | |

See footnotes to Table IIb.

TABLE IIa

| Example number | Base polyamide Actual temp. | Base polyamide Temp. range | Terminated base Actual temp. | Terminated base Temp. range | Extended base Actual temp. | Extended base Temp. range | Resin (epoxidation) Actual temp. | Resin (epoxidation) Temp. range |
|---|---|---|---|---|---|---|---|---|
| 50 | 180 | 120-240 | 155 | 120-180 | 105 | 100-120 | | |
| 51 | 22 | 15-25 | | | | | 60-70 | 50-80 |
| 52 | 22 | 15-25 | | | | | 60-70 | 50-80 |
| 53 | 150 | 120-160 | | | | | 75-85 | 45-100 |
| 54 | 185 | 110-250 | | | | | 75-85 | 45-100 |
| 55 | 200 | 110-250 | | | | | 66-68 | 45-100 |
| 56 | 185 | 110-250 | | | | | 70 | 45-100 |
| 57 | 150 | 110-250 | | | | | 75 | 45-100 |
| 58 | 165 | 160-210 | | | | | 85 | 60-110 |
| 59 | 185-200 | 110-250 | | | | | 60-70 | 45-100 |
| 60 | 185-200 | 110-250 | | | | | 60-70 | 45-100 |
| 61 | 200 | 120-240 | 165 | 120-180 | 105 | 100-120 | 94 | 50-100 |
| 62 | 195 | 110-250 | | | | | 65 | 45-100 |
| 63 | 194 | 110-250 | | | | | 56 | 45-100 |
| 64 | 198 | 110-250 | | | | | 76 | 45-100 |
| 65 | 185-200 | 110-250 | | | | | 60-65 | 45-100 |
| 66 | 185-200 | 110-250 | | | | | 45 | 45-100 |
| 67 | 185-200 | 110-250 | | | | | 50 | 45-100 |
| 68 | 185-200 | 110-250 | | | | | 45 | 45-100 |

TABLE IIb
(Weight in grams; time in hours)

| Ex. No. | Base polyamide I. Acid | Base polyamide II. Backbone polyamine | Base polyamide Water | Base polyamide Reaction time | Terminated base III. Terminating polyamine | Terminated base Reaction time | Extended base IV. Chain extender | Extended base Water | Extended base Reaction time | Epoxidized V. Epoxidizing agent | Epoxidized Water | Epoxidized Reaction time |
|---|---|---|---|---|---|---|---|---|---|---|---|---|
| 50 | 101 | 48.9 | 101 | 1 hr. 30 min | 5.1 | 1 hr. 45 min | 4 | 50 | 1 hr. 40 min | | | |
| 51 | 40 | 28.3 | [12] 160 | 20 hr | | | | | | 30.5 | 200 | 2 hr. |
| 52 | 40 | 40.0 | [12] 160 | 20 hr | | | | | | 61.0 | 200 | 3 hr. |
| 53 | 63 | 56.0 | 60 | 1 hr | | | | | | 50.0 | 500 | 8 hr. |
| 54 | 52 | 56.0 | 50 | 2 hr | | | | | | 50.0 | 400 | 3 hr. 50 min. |
| 55 | 118 | 109.0 | 100 | 1 hr 30 min | | | | | | 92.0 | 1000 | 45 min. |
| 56 | 66 | 56.0 | 50 | 1 hr. 30 min | | | | | | 50.0 | 520 | 30 min. |
| 57 | 160 | 113.0 | 0 | 2 hr | | | | | | 92.5 | 1660 | 3 hr. |
| 58 | 65 | 56.0 | 50 | 3 hr | | | | | | 50.0 | 450 | 4 hr. |
| 59 | 292 | 226.6 | 100 | 2 hr | | | | | | 185.0 | 3800 | 8 hr. |
| 60 | 292 | 226.6 | 100 | 2 hr | | | | | | 185.0 | 3800 | 8 hr. |
| 61 | 146 | 97.8 | 146 | 2 hr | 12.5 | 2 hr | 8 | 100 | 1 hr. 30 min | 250.0 | 1800 | 3 hr. |
| 62 | 40 | 28.4 | 20 | 3 hr | | | | | | 23.2 | 470 | 1 hr 10 min. |
| 63 | 87 | 56.3 | 25 | 3 hr. 35 min | | | | | | 46.4 | 450 | 38 min. |
| 64 | 87 | 28.8+25.2 | 25 | 1 hr. 50 min | | | | | | 13.0 | 920 | 5 hr. 40 min. |
| 65 | 87 | 3+51.5 | 25 | 1 hr. 50 min | | | | | | 46.3 | 940 | 16 min. |
| 66 | 87 | 3+51.5 | 25 | 1 hr. 50 min | | | | | | 23.1 | 940 | 40 min. |
| 67 | 87 | 13.2+34 | 25 | 1 hr. 50 min | | | | | | 13.9 | 940 | 16 min. |
| 68 | 87 | 13.2+34 | 25 | 1 hr. 50 min | | | | | | 27.8 | 940 | 37 min. |

[1] Outside the scope of U.S. 2,926,116 and 2,926,154, but prepared according to their method.
[2] Considered to be a mono-acid.
[3] Unsaturated acid.
[4] Hydroxy acid.
[5] Prepared according to U.S. Pat. No. 3,125,552.
[6] Results after 19 days of aging.
[7] Tri-acid.
[8] 2.0% concentration instead of 0.5%.
[9] 3.0% concentration instead of 1.0%.
[10] A chain extender (quaternizing agent) was used instead of an epoxidizing agent.
[11] Decarboxylates.
[12] Isopropanol was used in place of the water.
[13] Benzene was used in place of the water.

(7) Interpretation of Tables I, Ia, Ib, and II, IIa, IIb (A) Tables I, Ia, Ib: Examples Nos. 1 through 49 disclose various reactants, most of which are representative of those useful in this invention, as well as representative reaction conditions.

Examples 1–21, and 42–49 disclose different acids. Most of these examples use the identical backbone polyamine, terminating polyamine, chain extender, and epoxidizing agent, so as to afford an objective basis for analyzing the relative merits of the acids.

It is thus apparent that Examples 2, 3, 4, 6, 13, 14, 19, and 20 use acids that are not suitable for making the wet strength resins of this invention. Particularly interesting is the fact that the saturated acids of Examples 2, 3, and 4 decarboxylate and are therefore unsuitable, whereas their corresponding esters (Examples 1 and 5) are excellent. Example 13 shows that acyl halides are unsuitable, Examples 19 and 20 show that lactones are unsuitable, and Example 14 shows that those unsaturated acids which decarboxylate are unsuitable.

Useful saturated dicarboxylic acids are disclosed in Examples 7, 12, 15, 18, 21–41, and 43–49. A useful unsaturated dicarboxylic acid is disclosed in Example 18. A useful tricarboxylic acid is disclosed in Example 43. Useful $C_{1-12}$ alkyl mono- and di-esters are disclosed in Examples 1, 5, 10, 11, 17, and 42. Useful anhydrides are disclosed in Examples 8, 9, and 16.

Various backbone polyamines, terminating polyamines, chain extenders, and epoxidizing agents are also disclosed in the examples within the scope of this invention.

The mole ratios of backbone polyamine to acid of examples within the scope of this invention in Table I vary from 0.75 to 0.95. This mole ratio was purposely kept at about 0.95 very frequently in order to compare the efficacy of the reactants on an objective basis. The mole ratios of epoxidizing agent to active amino groups of examples in Table I within the scope of this invention vary from 0.70 to 1.89.

Particular attention should be given to Examples 21–41. These all use adipic acid and disclose that great variation of the other reactants and of the mole ratios are possible.

The "percent active" column is extremely important for reasons noted previously under "reactant parameters." It must be understood, of course, that the activity of a resin is secondary to its "percent wet strength." If a resin has a low wet strength, its activity is completely irrelevant to its usefulness.

(B) Tables II, IIa, IIb: Examples 50 through 68 disclose resins outside the scope of this invention.

Example 50 was made with reactant ingredients that are within the scope of this invention, but with a mole ratio of backbone polyamine to acid that was too high (0.95), resulting in a water insoluble polyamide that could not be epoxidized. Example 49 used the same reactants, but with a lower mole ratio (0.9). This indicates that the mole ratio of backbone polyamine to acid should be within the lower part of the mole ratio range when a higher acid is used.

Example 61 differs from those within the scope of this invention only in that an epoxidizing agent outside the scope of the invention was used. It should be noted that the epoxidizing agent is useful as a chain extender in this invention, and is well known as a quaternizing agent. This shows that the chain extension and epoxidation steps of this invention are distinct, and that the reactants are not interchangeable.

Examples 54–56, 59, 60, and 62–68 are within the scope of U.S. Pats. Nos. 2,926,116 or 2,926,154. It is noted that only Examples 55, 56, and 59 and 60 would be wet strength resins according to the accepted definition (see "Testing of Wet Strength Efficiency," supra), and that the highest percent activity among them is 21.5.

Particular attention should be given to Examples 63–68, all of which used the same reactants. Various mole ratios, temperatures, and reactants were tried, all being within the scope of the above patents, but a wet strength resin could not be produced.

Examples 51–53, and 57 are outside the scope of the above patents because of the choice of acid or substituted acid. It should be noted that Examples 51 and 52 differ only as to the choice of backbone polyamine, and that Example 52 shows wet strength properties, although of a poor caliber.

Example 58 is within the scope of U.S. Pat. No. 3,125,552. This is a wet strength resin as defined herein, although the percent activity is only 10.

(8) Use of resins at various pulp pH values

The wet strength resins of this invention may be used under both acid and alkaline pulp conditions. The following table shows that two batches of a typical resin (that of Example 22) were both effective for wet strength purposes when used with pulp pH values of from 4 to 10.

TABLE III

| | Percent wet strength | | |
|---|---|---|---|
| | 0.5% added | 1.0% added | Batch |
| Pulp pH: | | | |
| 4.0 | 18.7 | 22.4 | 1 |
| 5.0 | 16.2 | 20.0 | 2 |
| 6.0 | 20.3 | 22.2 | 2 |
| 7.0 | 21.0 | 26.5 | (1) |
| 8.0 | 21.4 | 29.2 | (1) |
| 9.0 | 21.2 | 27.4 | 2 |
| 10.0 | 22.1 | 29.1 | 1 |

[1] Average of tests on two batches.

(9) Ageing and stability qualities

Samples of resins both within and outside the scope of this invention were tested for stability and efficacy upon ageing. The results were as follows.

TABLE IV

| | Resin of example number | Time, days | Temperature, °C. | Original wet strength | | Aged wet strength | | Percent of wet strength retention | | |
|---|---|---|---|---|---|---|---|---|---|---|
| | | | | 0.5% | 1.0% | 0.5% | 1.0% | 0.5% | 1.0% | Average |
| Sample: | | | | | | | | | | |
| A | 21 | 349 | 22 | 21.8 | 23.8 | 19.6 | 24.6 | 90.0 | 103.0 | 96.5 |
| B | (1) | 182 | 22 | 18.5 | 22.0 | 16.5 | 18.1 | 90.0 | 82.4 | 86.2 |
| C | 21 | 14 | 50 | 19.6 | 24.6 | 18.5 | 21.0 | 94.4 | 85.3 | 89.9 |
| D | (1) | 9 | 50 | 17.3 | 21.2 | 15.4 | 18.8 | 89.0 | 88.6 | 88.8 |
| E | 22, 41 | 19 | 22 | 16.2 | 20.7 | 22.3 | 27.2 | 137.0 | 131.0 | 134.0 |
| F | 22 | 137 | 22 | 19.9 | 22.8 | 18.8 | 22.2 | 94.5 | 97.3 | 95.9 |

[1] The resin of Example I of U.S. Pat. Nos. 2,926,116 and 2,926,154.

The viscosities of the resin of Example 22 after varying ageing periods were correlated with their respective wet strengths, in order to provide a means for quickly estimating the efficacy of a given resin without the necessity of preparing handsheets. This data is as follows:

TABLE V

| Aging period (50° C.) | Percent wet strength (0.5%) | Percent of original wet strength retained | Viscosity [1] | Percent of original viscosity retained |
|---|---|---|---|---|
| 0 | 22.8 | | 620 | |
| 3 days | 20.5 | 90 | 500 | 81 |
| 5 days | 19.4 | 85 | 440 | 71 |
| 7 days | 17.5 | 77 | 405 | 65 |
| 9 days | 16.2 | 71 | 266 | 43 |

[1] Measured in centipoises on a Brookfield Viscometer at 25° C.

Based on a correlation of the figures of Table V, an aging test are conducted on additional resins within the scope of this invention, over a 72 hour period at 50° C. The results were as follows.

TABLE VI

| Sample | Resin of Example No. | Initial viscosity[1] | Final viscosity[1] | Percent of original viscosity retained | Estimated percent of original wet strength retained |
|---|---|---|---|---|---|
| A | 1 | 70 | 50 | 71 | 85 |
| B | 5 | 10 | 10 | 100 | 100 |
| C | 7 | 16 | 15 | 94 | 97 |
| D | 17 | 2,700 | 2,000 | 74 | 87 |
| E | 34 | 30 | 36 | 120 | 100+ |
| F | 45 | 5 | 5 | 100 | 100 |
| G | 48 | 85 | 65 | 76 | 88 |
| H | 49 | 12 | 10 | 83 | 91 |

[1] Measured in centiposes on a Brookfield Viscometer at 25° C.

(10) Waste paper recycling and broke recovery

Most wet strength resins increase the difficulty of recycling waste paper and recovering broke. Broke is defined as paper that has been discarded during the process of its manufacture, and includes web selvage, roll ends, blemished paper, etc. As broke generally constitutes about 10% of production, its recovery is important. The recovery (repulping) of wet strength treated paper is made difficult by the presence of the resins, which do not easily degrade. It therefore is advantageous to use a resin which can degrade during broke recovery without a sacrifice of wet strength.

Broke from paper which is treated with the wet strength resins of this invention is more easily recovered (i.e.: repulped) than broke from paper treated with other wet strength resins such as for example, those of U.S. Pats. Nos. 2,926,116 and 2,926,154. In a mill trial, it was found that paper containing the resin of Example 22 added at 0.5 to 0.6% and 40% activity was easily repulped in a hydra pulper at a temperature of 21–32° C. It is believed that this is primarily due to the slower polymerization rate of the resins of this invention. Thus, when broke treated with the resins of this invention is repulped, the resins are still incompletely polymerized and therefore degrade more easily. The polymerization of the resin is completed upon moderate aging, and is thus complete by the time the paper is used. By contrast, the polymerization of the resins of the above-mentioned patents is complete once the web is produced. The presence of resin-treated paper that does not degrade can jam the machinery, causing a work stoppage while it is physically removed. Small pieces of such paper can blemish the finished paper.

Another factor contributing to easier broke recovery when using the resins of this invention, is that they have a lesser degree of self-sizing. That is, the resins of this invention impart a lower degree of water repellency to the paper than do those of U.S. Pats. Nos. 2,926,116 and 2,926,154. As a result, the broke has greater water absorbancy and is more easily repulped. Additionally, this property eliminates, in part, the need for adding a rewetting agent to the pulp to increase water absorbancy where desired, such as in paper towelling.

Waste paper may also be more easily recovered if it contains the wet strength resins of this invention. Even when fully polymerized, the resins of this invention are more easily degraded in the repulping process than the resins of the prior art. Melamine-type wet strength resins, for example, if used in amounts of 1 to 3%, cannot be broken up in the waste paper repulping process. Paper treated with such resins must be physically removed, and cannot be recycled. The lower self-sizing properties of paper treated with wet strength resins of this invention also contributes towards the ease of repulping.

I claim:

1. An aqueous resin solution or aqueous colloidal suspension comprising a resin which is the reaction product of
   (A) a member selected from at least one of the group consisting of
      (a) saturated dicarboxylic acids having 4 to 12 carbon atoms;
      (b) non-decarboxylating unsaturated dicarboxylic acids having from 5 to 12 carbon atoms;
      (c) saturated and non-decarboxylating unsaturated tricarboxylic acids having 6 to 10 carbon atoms;
      (d) $C_{1-12}$ alkyl mono- and di-esters of saturated and unsaturated dicarboxylic acids having 2 to 12 carbon atoms;
      (e) $C_{1-12}$ alkyl mono- and di-esters of saturated and unsaturated tricarboxylic acids having 6 to 10 carbon atoms; and
      (f) anhydrides of saturated and unsaturated dicarboxylic acids having 4 or 5 carbon atoms; with
   (B) at least one backbone polyamine, present in about 0.66 to about 0.99 mole per mole of the member, which may be branched or straight chain, and which contains at least two primary amino groups and at least one secondary or tertiary amino group, with the proviso that if the member has 10 or more carbon atoms, not more than 0.90 mole of the backbone polyamine are present, to form a base polyamide having free carboxylic groups;
   (C) at least one terminating polyamine, present in an amount at least sufficient to cap all free carboxylic groups remaining on the base polyamide, which may be branched or straight chain, and which contains only one primary amino group and at least one secondary or tertiary amino group, to form a terminated base;
   (D) a chain extender, present in about equimolar quantities with the terminated base, selected from at least one of the group consisting of alkyldihalide, alkyletherdihalide, phenyl bis-(alkylhalide), and phenylalkyldihalide, all containing from one to twelve carbon atoms, to form an extended base; and
   (E) an epoxidizing agent, present in about 0.6 to about 1.5 moles per unreacted secondary or tertiary amino group remaining on the extended base, with the proviso that the amount of epoxidizing agent is not sufficiently in excess to reduce the pH of the reaction medium below about 5.0, selected from at least one of the group consisting of epihalohydrins and alkyl substituted epihalohydrins.

2. The aqueous resin of claim 1 in which the resin is present in 70 parts by weight and the water is present in at least 30 parts by weight.

3. The resin of claim 2 in which the member is selected from at least one of the group consisting of: saturated dicarboxylic acids having 4 to 10 carbon atoms; $C_{1-12}$ alkyl mono- and di-esters of saturated and unsaturated dicarboxylic acids having 2 to 10 carbon atoms, and anhydrides of saturated and unsaturated dicarboxylic acids having 4 or 5 carbon atoms.

4. The resin of claim 2 in which the member is selected from at least one of the group consisting of: diethyloxalate; diethylmalonate; succinic acid; succinic anhydride; diethylsuccinate; monomethylsuccinate; maleic anhydride; D,L-malic acid, diglycollic acid; glutaric acid; glutaric anhydride; dimethylglutarate; itaconic acid; adipic acid; monomethyl adipate; pimelic acid; suberic acid, azelaic acid; and sebacic acid.

5. The resin of claim 4 in which the member is adipic acid.

6. The resin of claim 4 in which the member is methyl glutarate.

7. The resin of claim 2 in which the backbone polyamine is selected from at least one of the group consisting of: prim, sec-diethylenetriamine; prim, sec-tetraethylenepentamine; prim, tert-bis(aminopropyl) methylamine; prim, sec-pentaethylenehexamine, and prim, sec-triethylenetetramine.

8. The resin of claim 7 in which the backbone polyamine is prim, sec-diethylenetriamine.

9. The resin of claim 2 in which the terminating polyamine is selected from at least one of the group consisting of: prim, tert-dimethylaminopropylamine; and prim, sec-aminoethylethanolamine.

10. The resin of claim 9 in which the terminating polyamine is prim, tert-dimethylaminopropylamine.

11. The resin of claim 2 in which the chain extender is selected from at least one of the group consisting of: methylenedibromide; ethylenedibromide; methylenediiodide; dichloroethylether; dichloroisopropylether; and triglycoldichloride.

12. The resin of claim 11 in which the chain extender is dichloroethylether.

13. The resin of claim 2 in which the epoxidizing agent is an epihalohydrin.

14. The resin of claim 13 in which the epoxidizing agent is epichlorohydrin.

15. The resin of claim 2 in which the member is adipic acid, the backbone polyamine is prim, sec-diethylenetriamine, the terminating amine is prim, tert-dimethylaminopropylamine, the chain extender is dichloroethylether and the epoxidizing agent is epichlorohydrin.

16. The resin of claim 2 in which the member is methyl glutarate, the backbone polyamine is prim, sec-diethylenetriamine, the terminating amine is prim, tert-dimethylaminopropylamine, the chain extender is dichlorethylether and the epoxidizing agent is epichlorohydrin.

17. The resin of claim 2 in which the backbone polyamine is present in about 0.75 to about 0.95 mole.

18. The resin of claim 2 in which the epoxidizing agent is present in about 1.0 to about 1.4 moles.

19. A process for synthesizing a resin comprising:
(A) reacting in the presence of at least enough water to make a slurry
(I) a member selected from at least one of the group consisting of
(a) saturated dicarboxylic acids having 4 to 12 carbon atoms;
(b) non-decarboxylating unsaturated dicarboxylic acids having from 5 to 12 carbon atoms;
(c) saturated and non-decarboxylating unsaturated tricarboxylic acids having 6 to 10 carbon atoms;
(d) $C_{1-12}$ alkyl mono- and di-esters of saturated and unsaturated dicarboxylic acids having 2 to 12 carbon atoms;
(e) $C_{1-12}$ alkyl mono- and di-esters of saturated and unsaturated tricarboxylic acids having 6 to 10 carbon atoms; and
(f) anhydrides of saturated and unsaturated dicarboxylic acids having 4 or 5 carbon atoms, with
(II) at least one backbone polyamine, present in about 0.66 to about 0.9 mole per mole of the member, which may be branched or straight chain, and which contains at least two primary amino groups and at least one secondary or tertiary amino group, with the proviso that if the member has 10 or more carbon atoms, not more than 0.90 mole of the backbone polyamine are present, to form a base polyamide having free carboxylic groups, at a temperature of from about 120° C. to about 240° C. and for a time of from about 1 to about 6 hours, with the provisos that if an oxalic acid ester is used the temperature is from about 15 to about 25° C. and the time is from about 5 to about 20 hours, if a malonic acid ester is used the temperature is from about 80 to about 160° C., if an acid containing five carbon atoms is used the temperature is from about 120 to about 175° C., if malic acid is used the temperature is from about 120 to about 155° C., and if a diester is used the temperature is from about 80° C. to about the reflux temperature of the mixture of base polyamide and alcohol by-product which forms, or the temperature at which the base polyamide degrades, whichever is lower;
(B) removing any water, alcohol, or water/alcohol mixture present;
(C) reacting the base polyamide with at least one terminating polyamine, present in an amount at least sufficient to cap all free carboxylic groups remaining on the base polyamide, which may be branched or straight chain, and which contains only one primary amino group and at least one secondary or teriary amino group, to form a terminated base, at a temperature of from about 120° C. to about 180° C. for a time of from about 15 minutes to about 3 hours, with the provisos that if an oxalic acid ester is used the temperature is from about 70 to about 90° C., if a malonic acid ester is used to temperature is from about 80 to about 100° C., if an acid containing five carbon atoms is used the temperature is from about 120 to about 170° C., and if malic acid is used the temperature is from about 100 to about 120° C.;
(D) adding water to the terminated base in an amount at least sufficient to make a uniform solution;
(E) reacting the terminated base solution with a chain extender, present in about equimolar quantities with the terminated base, selected from at least one of the group consisting of alkyldihalide, alkyletherdihalide, phenyl bis-(alkylhalide), and phenylalkyldihalide, all containing from one to twelve carbon atoms, to form an extended base solution, at a temperature of from about 100° C. to about 120° C. for a time of from about 1 hour to about 3 hours, with the provisos that if an oxalic acid ester is used the temperature is from about 70 to about 90° C. and if a malonic acid ester is used the temperature is from about 80 to about 100° C.;
(F) adding water to the extened base in an amount dependent on the desired concentration of the final product;
(G) reacting the extended base solution with an epoxidizing agent, present in about 0.6 to about 1.5 moles per unreacted secondary or tertiary amino group remaining on the extended base, with the proviso that the amount of epoxidizing agent is not sufficiently in excess to reduce the pH of the reaction medium below about 5.0, selected from at least one of the group consisting of epihalohydrins and alkyl substituted epihalohydrins; at a temperature range from about 40° C. to about 90° C. for a time of from about 20 minutes to about 15 hours to form a completed resin, with the proviso that if an oxalic acid ester is used the temperature is from about 40 to about 70° C.

20. The process of claim 19 with the additional step of preparing a resin solution by adding water in an amount sufficient to reduce the concentration of active material to the desired level and an acid in an amount sufficient to reduce the pH of the resin solution to from about 1.0 to about 5.5.

21. The process of claim 19 in which the member is adipic acid.

22. The process of claim 19 in which the member is dimethyl glutarate.

23. A process for synthesizing a resin comprising:
(A) reacting a member selected from at least one of the group consisting of $C_{1-12}$ alkyl di-esters of saturated and unsaturated dicarboxylic acids having 2 to 12 carbon atoms, and $C_{1-12}$ alkyl di-esters of saturated and unsaturated tricarboxylic acids having 6 to 10 carbon atoms; with at least one backbone polyamine, present in about 0.66 to about 0.99 mole per mole of the member, which may be branched or straight chain, and which contains at least two primary amino groups and at least one secondary or tertiary amino group, with the proviso that if the member has 10 or more carbon atoms, not more than 0.90 mole of the backbone polyamine are present, to form a mixture of a base polyamide having free carboxylic groups and an alcohol by-product, at a temperature of from about 80° C. to about the reflux temperature of the base polyamide/alcohol mixture or the temperature at which the base polyamide degrades, whichever is lower, for a time of from about 1 to about 6 hours, with the provisos that if an oxalic acid ester is used the temperature is from about 15 to about 25° C. and the time is from about 5 to about 20 hours; if a malonic acid ester is used the temperature is from about 80 to about 160° C., and if the ester of an acid containing five carbon atoms is used the temperature is from about 80 to about 150° C.;

(B) reacting the base polyamide/alcohol mixture with at least one terminating polyamine, present in an amount at least sufficient to cap all free carboxylic groups remaining on the base polyamide, which may be branched or straight chain, and which contains only one primary amino group and at least one secondary or tertiary amino group, to form a terminated base/alcohol mixture, at a temperature of from about 80° C. to about the reflux temperature of the terminated base/alcohol mixture or the temperature at which the terminated base degrades, whichever is lower, for a time of from about 15 minutes to about 3 hours, with the provisos that if an oxalic acid ester is used the temperature is from about 70 to about 90° C.; if a malonic acid ester is used the temperature is from about 80 to about 100° C., and if the ester of an acid containing five carbon atoms is used the temperature is from about 80 to about 100° C.;

(C) adding water to the terminated base/alcohol mixture in an amount at least sufficient to make a uniform solution;

(D) reacting the terminated base/alcohol/water solution with a chain extender, present in about equimolar quantities with the terminated base, selected from at least one of the group consisting of alkyldihalide, alkletherdihalide, phenyl bis-(alkylhalide), and phenylalkyldihalide, all containing from one to twelve carbon atoms, to form an extended base/alcohol/water solution, at a temperature of from about 80° C. to about the reflux temperature of the extended base/alcohol/water solution or the temperature at which the extended base degrades, whichever is lower, for a time of from about 1 hour to about 3 hours, with the provisos that if an oxalic acid ester is used the temperature is from about 70 to about 90° C., if a malonic acid ester is used the temperature is from about 80 to about 100° C., and if the ester of an acid containing five carbon atoms is used the temperature is from about 80 to about 100° C.;

(E) adding water to the extended base/alcohol/water solution in an amount dependent on the desired concentration of the final product;

(F) reacting the extended base/alcohol/water solution with an epoxidizing agent, present in about 0.6 to about 1.5 moles per unreacted secondary or tertiary amino group remaining on the extended base, with the proviso that the amount of epoxidizing agent is not sufficiently in excess to reduce the pH of the reaction medium below about 5.0, selected from at least one of the group consisting of epihalohydrins and alkyl substituted epihalohydrins; at a temperature range from about 40° C. to about 90° C. for a time of from about 20 minutes to about 15 hours to form a completed resin, with the proviso that if an oxalic acid ester is used the temperature is from about 40 to about 70° C.

24. The process of claim 23 in which the member is dimethyl glutarate.

References Cited

UNITED STATES PATENTS

| | | | |
|---|---|---|---|
| 2,882,185 | 4/1959 | Valko et al. | 260—78 SC |
| 3,215,654 | 11/1965 | Schmalz | 260—29.2 EP |
| 3,240,761 | 3/1966 | Keim et al. | 260—78 SC |
| 3,250,664 | 5/1966 | Conte et al. | 260—78 SC |
| 3,329,657 | 7/1967 | Strazdins et al. | 260—29.2 EP |
| 3,397,161 | 8/1968 | Miller | 260—78 SC |
| 3,459,697 | 8/1969 | Goldberg et al. | 260—29.2 EP |
| 3,642,572 | 2/1972 | Endres et al. | 260—78 SC |

PAUL LIEBERMAN, Primary Examiner

A. H. KOECKERT, Assistant Examiner

U.S. Cl. X.R.

162—164; 260—78 SC

UNITED STATES PATENT AND TRADEMARK OFFICE
CERTIFICATE OF CORRECTION

PATENT NO. : 3,793,279

DATED : February 19, 1974

INVENTOR(S) : Stanley A. Lipowski

It is certified that error appears in the above—identified patent and that said Letters Patent are hereby corrected as shown below:

Column 4, line 9, "extendr" should be --extender--. Column 8, line 13, "teh" should be --the--. Columns 9 and 10, Table I, Example 23, under heading "V. Epoxidizing Agent", "do" should be --Epibromohydrin--; columns 9 and 10, Table I, Example 25, under heading "V. Epoxidizing Agent", "do" should be --Epichlorohydrin--; columns 9 and 10, Table Ia, Example 31, under heading "Actual Temp." (fourth occurrence), "75" should be --70--. Columns 11 and 12, Table Ib, Example 13, under heading "Reaction Time" (second occurrence), "30 hr" should be --30 min--; columns 11 and 12, Table Ib, Example 14, under heading "Reaction Time" (second occurrence), "15 hr" should be --15 min--; columns 11 and 12, Table Ib, Example 15, under heading "Reaction Time" (second occurrence), "55 hr" should be --55 min--. Column 17, line 2, "are" should be --was--. Column 19, line 56, "0.9" should be --0.99--.

Signed and Sealed this

Thirteenth Day of June 1978

[SEAL]

Attest:

RUTH C. MASON
Attesting Officer

DONALD W. BANNER
Commissioner of Patents and Trademarks